UNITED STATES PATENT OFFICE.

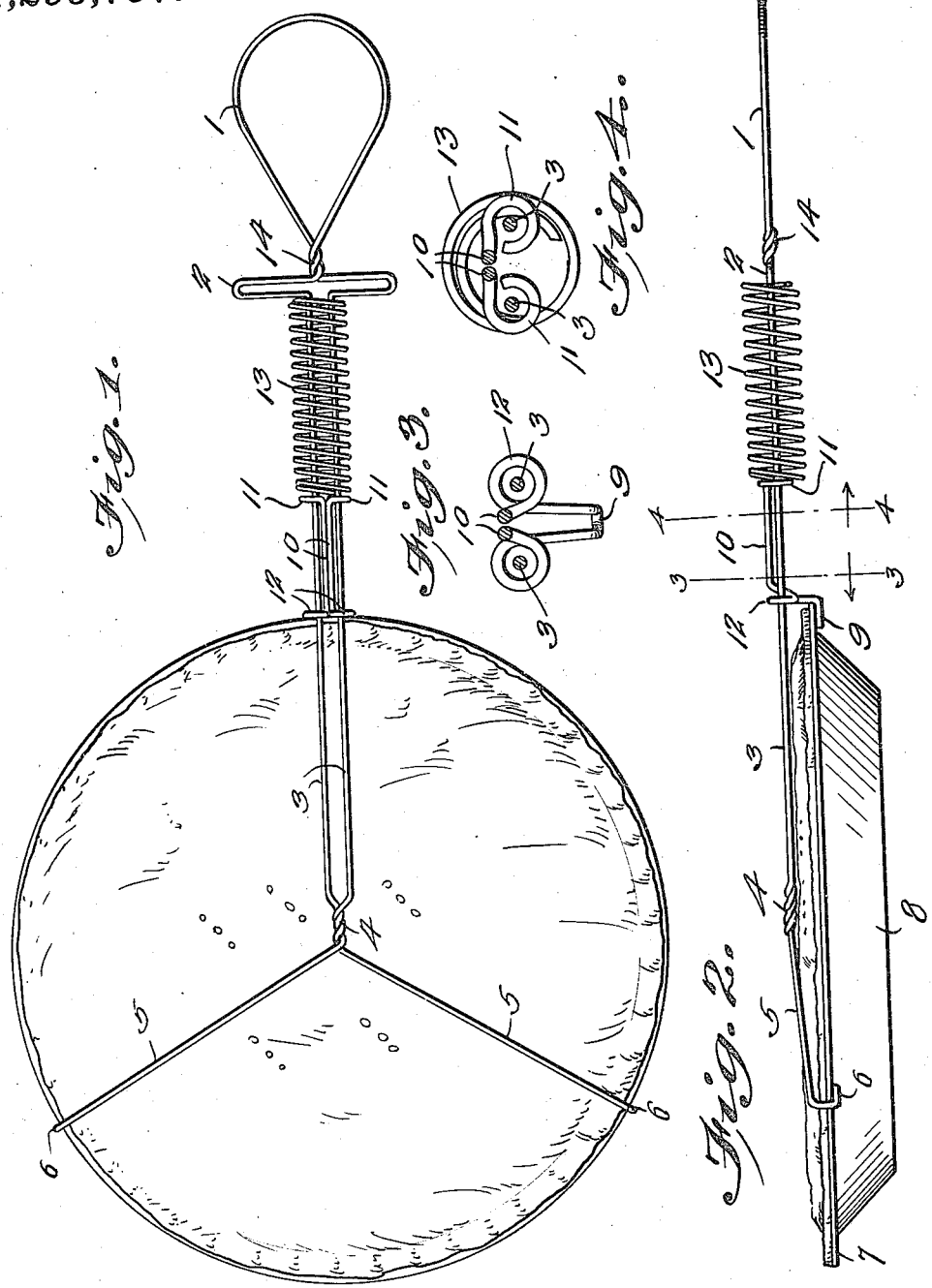

STEPHEN G. SINGLETON, OF BURKE, IDAHO.

PLATE-LIFTER.

1,299,797.  Specification of Letters Patent.  Patented Apr. 8, 1919.

Application filed January 9, 1919. Serial No. 270,343.

*To all whom it may concern:*

Be it known that I, STEPHEN G. SINGLETON, a citizen of the United States, and a resident of Burke, in the county of Shoshone and State of Idaho, have invented certain new and useful Improvements in Plate-Lifters, of which the following is a specification.

My invention is an improvement in plate lifters, and has for its object to provide a device of the character specified especially adapted for handling pie plates and the like, wherein a handle is provided having means in connection therewith for gripping the edges of the plate, the said means being releasable at will and spring controlled to grip the plate.

In the drawings:

Figure 1 is a top plan view showing the device in use;

Fig. 2 is a side view;

Figs. 3 and 4 are sections on the lines 3—3 and 4—4, respectively, of Fig. 2.

The present embodiment of the invention is formed from a piece of wire doubled upon itself to form a loop shaped handle 1 and a loop shaped stop 2 extending transversely of the long axis of the handle, and a shank 3 composed of members lying alongside each other in spaced parallel relation.

Beyond the parallel members 3 the portions of the wire are twisted together, as indicated at 4, and the extremities are bent outwardly away from each other to form gripping jaws 5, each having a hook 6 at its free end. The jaws 6 are fixed jaws, adapted to catch beneath the flange 7 of a pie plate 8 and a movable jaw 9 is mounted to slide on the shank 3. The movable jaw is formed by doubling the wire upon itself, the connection between the two portions of the wire being bent laterally to form the hook, as shown more clearly in Fig. 3. The portions of the wire are then bent around the wires 3 of the shank of the handle to embrace the said wires loosely, after which the said portions are bent to lie closely alongside each other. The extremities are bent around the wires 3 in the form of rings, as indicated at 11, the said rings 11 also loosely embracing the wires 3. Thus the movable jaw and its support, namely, the elements 10, is mounted to move on the portions 3 of the shank by the rings 11 and 12.

A coil spring 13 is mounted on the shank between the stop 2 and the rings 11, and this spring acts normally to force the movable jaw 9 toward the fixed jaw 6. The ends of the spring are connected with the rings 11 so that the said rings, the shank 10 and the movable jaw move with the spring.

Between the handle 1 and the stop 2 the two portions of the wire forming the handle are twisted together, as indicated at 14, and the stop 2, which is a loop, is formed by bending the two portions of the wire outwardly away from each other and then inwardly toward each other.

In use, the user grasps the handle 1, with the index and second fingers engaging the rings 11. The hooks or gripping jaws 6 are now engaged with the edge of the pie plate, the jaw 9 being meanwhile withdrawn toward the handle by the pressure of the fingers. The handle is then lowered until the jaw 9 is below the edge of the plate, when the spring 13 is released. The jaw 9 is immediately engaged with the edge of the plate, and the entire plate may be lifted and may be handled without danger of dropping the same, and without burning the fingers.

I claim:

A plate lifter comprising a shank formed from a wire doubled upon itself with the ends lying in parallel spaced relation, said ends being twisted together at each end of the shank, the connection between the two portions at one end of the shank forming a handle and the extremities of the wire being bent to diverge at the other end and having hooks for engaging beneath the edge of a plate, a gripping hook mounted to slide on the shank and normally spring pressed toward the plate for gripping the edge of the same, the portions of the wire being bent outwardly adjacent to the handle end of the shank to form stops for engagement by the end of the spring remote from the sliding hook when the spring is compressed to release the hook.

STEPHEN G. SINGLETON.

Witnesses:
GEORGE WATSON,
DAVID E. WHERRY.